United States Patent
Wisniewski

(10) Patent No.: US 9,361,641 B2
(45) Date of Patent: *Jun. 7, 2016

(54) SYSTEM AND METHOD FOR TIRE INVENTORY AND PROMOTION

(71) Applicant: Maciej Wisniewski, West Bay (KY)

(72) Inventor: Maciej Wisniewski, West Bay (KY)

(*) Notice: Subject to any disclaimer, the term of this patent is extended or adjusted under 35 U.S.C. 154(b) by 477 days.

This patent is subject to a terminal disclaimer.

(21) Appl. No.: 13/683,908

(22) Filed: Nov. 21, 2012

(65) Prior Publication Data

US 2014/0143022 A1    May 22, 2014

(51) Int. Cl.
*G01M 17/02*    (2006.01)
*G06Q 10/08*    (2012.01)
*G06Q 30/06*    (2012.01)

(52) U.S. Cl.
CPC .......... *G06Q 30/0627* (2013.01); *G01M 17/02* (2013.01); *G06Q 10/08* (2013.01)

(58) Field of Classification Search
None
See application file for complete search history.

(56) References Cited

U.S. PATENT DOCUMENTS

| | | | |
|---|---|---|---|
| 5,174,151 A * | 12/1992 | Adachi et al. | 73/146 |
| 5,801,304 A * | 9/1998 | Cantu et al. | 73/146 |
| 6,016,695 A * | 1/2000 | Reynolds et al. | 73/146 |
| 6,151,959 A * | 11/2000 | Cantu et al. | 73/146 |
| 6,840,097 B1 * | 1/2005 | Huber et al. | 73/146 |
| 2008/0202229 A1 * | 8/2008 | Maehner et al. | 73/146 |
| 2010/0000310 A1 * | 1/2010 | Braghiroli | 73/146 |
| 2012/0048006 A1 * | 3/2012 | Koguchi et al. | 73/146 |
| 2013/0204752 A1 * | 8/2013 | Damon | 705/28 |
| 2014/0028916 A1 * | 1/2014 | Toyoda | H04N 21/4307 348/547 |
| 2014/0283590 A1 * | 9/2014 | Sotgiu | 73/146 |
| 2014/0283591 A1 * | 9/2014 | Takahashi et al. | 73/146 |

* cited by examiner

*Primary Examiner* — Andre Allen
(74) *Attorney, Agent, or Firm* — Joseph Stecewycz

(57) ABSTRACT

Disclosed is a system and method for modifying a tire inventory database in a tire inventory server using a computer, a table, or a mobile communication device, comprising: obtaining an image of tread pattern on a selected tire using an imaging device; measuring tread depth on the selected tire to obtain a tread depth reading; and transmitting the image of tread pattern and the tread depth reading to the tire inventory server.

20 Claims, 8 Drawing Sheets

SYSTEM AND METHOD FOR TIRE INVENTORY AND PROMOTION

FIELD OF THE INVENTION

The present invention relates to a system and method for maintaining an on-line tire inventory and, more particularly, to a web-based system for promoting sales of used tires.

BACKGROUND OF THE INVENTION

Internal tire inventory systems comprising used tires have been known in the art for some years. However, such inventory systems are not typically available for searching by a nonemployee or a prospective tire customer and, more importantly, do not provide searchable parameters for the tires, such as one or more of: tread depth, tire make, tire model, tire price, seller stock number, tire location (or distance from the prospective tire customer), and image of tire tread. What is needed is a system and method for maintaining an inventory of used tires, where a prospective customer can search the tire inventory using one or more of the above listed tire parameters.

BRIEF SUMMARY OF THE INVENTION

In one aspect of the present invention, a method of modifying a tire inventory database in a tire inventory server using a computer, a table, or a mobile communication device, comprises: obtaining an image of tread pattern on a selected tire using an imaging device; measuring tread depth on the selected tire to obtain a tread depth reading; and transmitting the image of tread pattern and the tread depth reading to the tire inventory server.

In another aspect of the present invention, a tire inventory station, suitable for use in modifying a tire inventory database, comprises: a first support beam fixed to a base; a work platform secured to a second support beam, the second support beam slideably retained in the first support beam; a first tire support arm having an end attached to one of the first and second support beams so as to form a first cantilever member; a second tire support arm having an end attached to one of the first and second support beams so as to form a second cantilever member; an imaging device removably attached to an underside of the work platform; and a tire depth gauge provided on the work platform.

In yet another aspect of the present invention, a tire inventory system, suitable for access by a prospective tire customer, comprises: a tire inventory server including a tire inventory database, the tire inventory database including tire tread depth data for each of a plurality of tires; a work platform having support arms for supporting a tire, the work platform having an imaging device removably attached to an underside of the work platform; at least one of a laptop, computer tablet, or mobile communication device accessible by a user of the work platform, the at least one of a laptop, computer tablet, or mobile communication device including a tire inventory software program, the at least one of a laptop, computer tablet, or mobile communication device further in communication with the tire inventory server via the tire inventory software program for enabling the user to enter tire tread depth data into the tire inventory database; and, a customer communication device in communication with the tire inventory server for enabling the prospective tire customer to search the tire inventory database.

The additional features and advantage of the disclosed invention is set forth in the detailed description which follows, and will be apparent to those skilled in the art from the description or recognized by practicing the invention as described, together with the claims and appended drawings.

BRIEF DESCRIPTIONS OF THE DRAWINGS

The foregoing aspects, uses, and advantages of the present invention will be more fully appreciated as the same becomes better understood from the following detailed description of the present invention when viewed in conjunction with the accompanying figures, in which.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

The present invention relates generally to (i) a system and method for classifying and inventorying a supply of new or used tires, and (ii) a method for promoting the sales of the tires. Fundamental to the operation of the disclosed method are: an apparatus used to measure the depth of a subject tire, and an inventory system that classifies tires according to brand, model, size, and tread depth.

Figure 1:
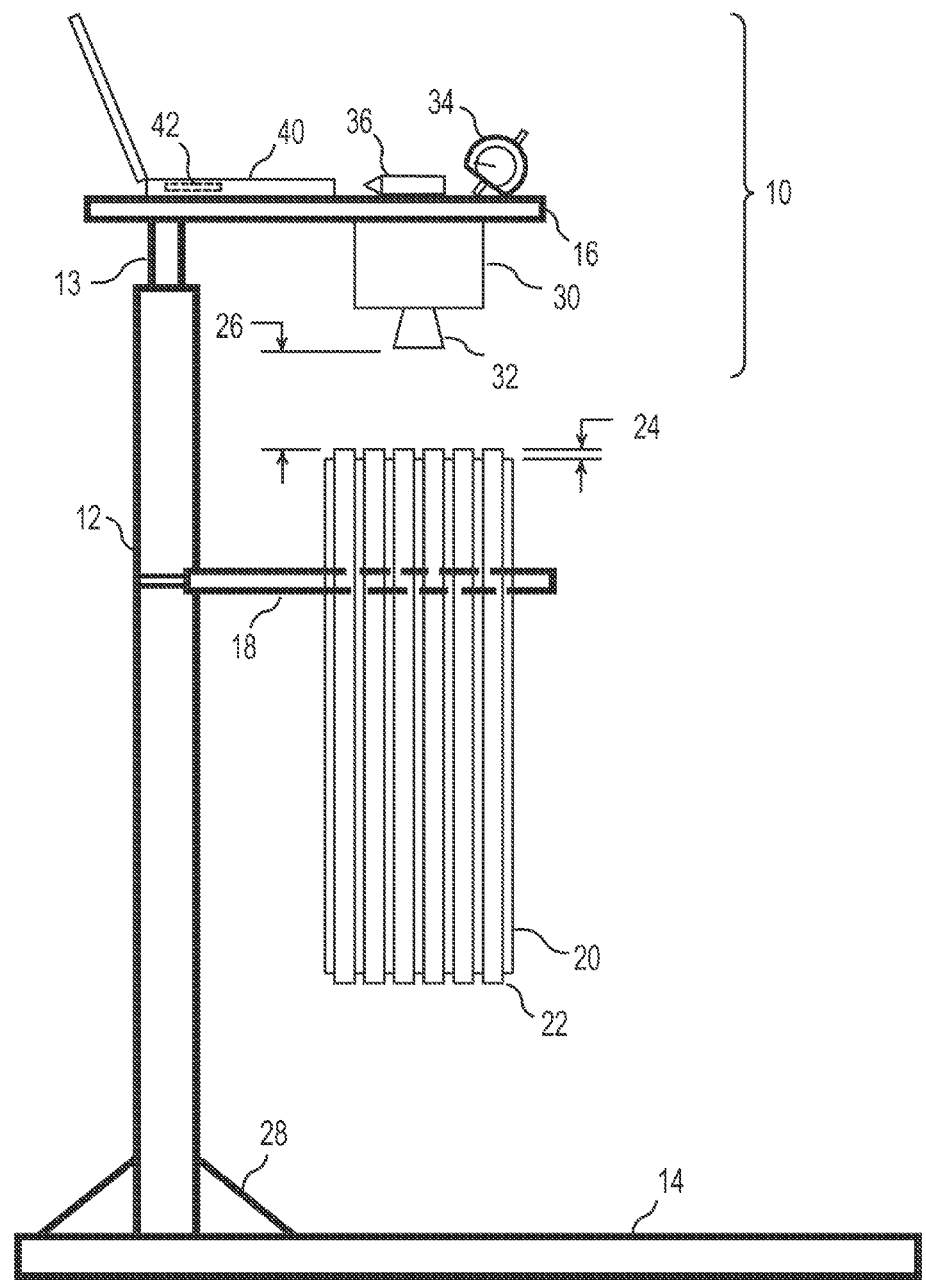
FIG. 1 is a diagrammatical side view illustration of a tire inventory station, in accordance with the present invention.
Figure 2:
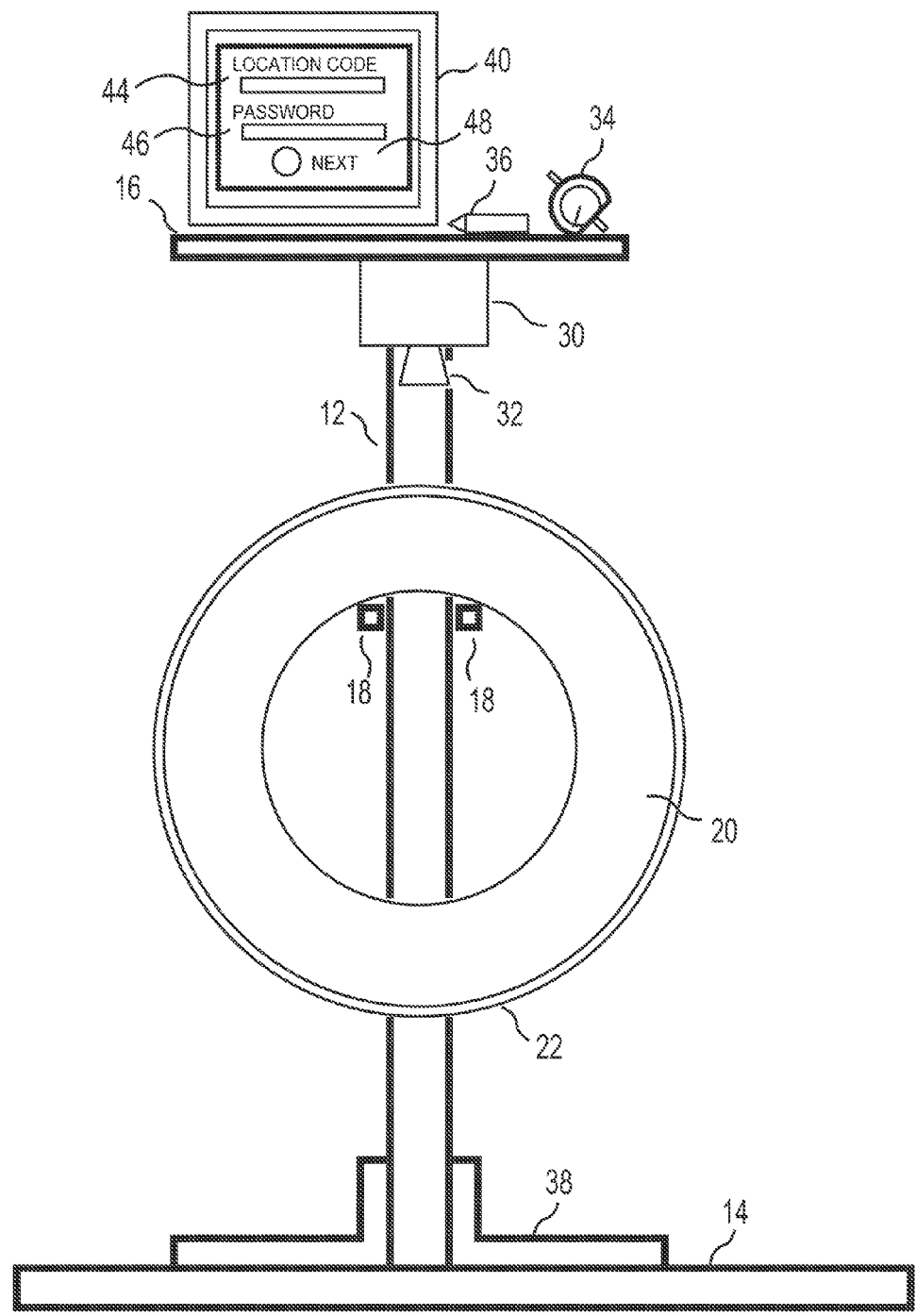
FIG. 2 is a diagrammatical front view illustration of the tire inventory station of FIG. 1.

There is shown in FIGS. 1 and 2 a tire inventory station 10, in accordance with an aspect of the present invention. The tire inventory station 10 may comprise a substantially vertical support beam 12 fixed to a base 14, the base 14 comprising base legs or a base platform as known in the art, and a work platform 16 secured to an adjustable support beam 13. Gussets 28 or L-brackets 38 may be provided to minimize movement between the support beam 12 and the base legs/platform 14, as is known in the relevant art. Tire support arms 18 may be slideably attached to the support beam 12 or, alternatively, may be fixed to the support beam 12 or to the adjustable support beam 13.

The tire support arms 18 may each comprise a cantilever member of sufficient rigidity to support a conventional tire 20 (with or without rim or alloy wheel) above ground level, as shown in the diagram. In an exemplary embodiment, the location of the tire support arms 18 may be fixed at a specified distance from ground level, such as at waist lever or at twenty eight inches above ground. In an alternative work station configuration, a user (herein referred to as a "Tire Lister") may be able to loosen and reposition the tire support arms so as to suspend the tire 20 at different desired working heights. The tire support arms 18 may be approximately twelve inches in length to provide support for the majority of tires that may be selected for inclusion in the tire inventory system. In an alternative embodiment, the fixed height and lengths of the tire support arms 18 may be different from the configuration described above, so as to accommodate alternate tire configurations.

The vertical position of the work platform 16 may also be adjusted by means of the disclosed configuration in which the secondary support beam 13 is slideably positioned and retained inside the support beam 12, so as to provide additional flexibility in configuring the tire inventory station 10. The secondary support beam 13 may thus be adjusted, and then secured in place by a cleave pin, a removable bolt, clamping means, or other fastening means (not shown) to provide the working distance preferred by the Tire Lister. In an exemplary embodiment, the secondary support beam 13 may comprise an approximately 0.75-inch wide tube (for a square cross section) or an approximately 0.75-inch diameter tube (for a round cross section). The support beam 12 may comprise an approximately one-inch wide square tube or an approximately one-inch diameter tube, either beam configuration having inside opening configured to slideably retain the respective secondary support beam 13.

An imaging device 30, such as a digital camera, a video recorder, or a mobile communication device with an internal camera, may be movably secured to an underside of the work platform 16 such that an imaging lens 32 on the imaging device 30 can be selectively directed onto a section of tire tread 22. As can be appreciated by one skilled in the art, the imaging device 30 may be used to acquire an image of the tread pattern on the tire 20, along any desired location on the tire circumference. The imaging device 30 is further in communication with a computing device 40, such as a laptop, a mobile communication device, or any other type of data acquisition apparatus. Accordingly, the imaging device 30 may selectively transmit one or more acquired tread pattern images to the computing device 40. Moreover, the computing device 40 may be in communication with a communication network, such as the Internet, as explained in greater detail below.

The computing device 40 may be placed on the work platform 16, as shown, or may be handheld by the Tire Lister, as desired. The height of the tire 20 above the base legs/platform 14, or base platform, may be adjusted by repositioning the tire support arms 18 so as to provide a working distance 26 of from about twenty four inches to about ten inches from the imaging lens 32, depending on the optical properties of the imaging lens 32.

The Tire Lister may manually measure tire tread depth 24 by means of a tire tread depth gauge 34, and the tread depth reading so obtained may be entered into the computing device 40 using a keyboard or touchscreen. The tire 20 can be physically marked for inventory purposes by: (i) writing with a grease pencil 36, or (ii) placing a self-adhering label (not shown) on the tire, as explained in greater detail below.

Figure 3:
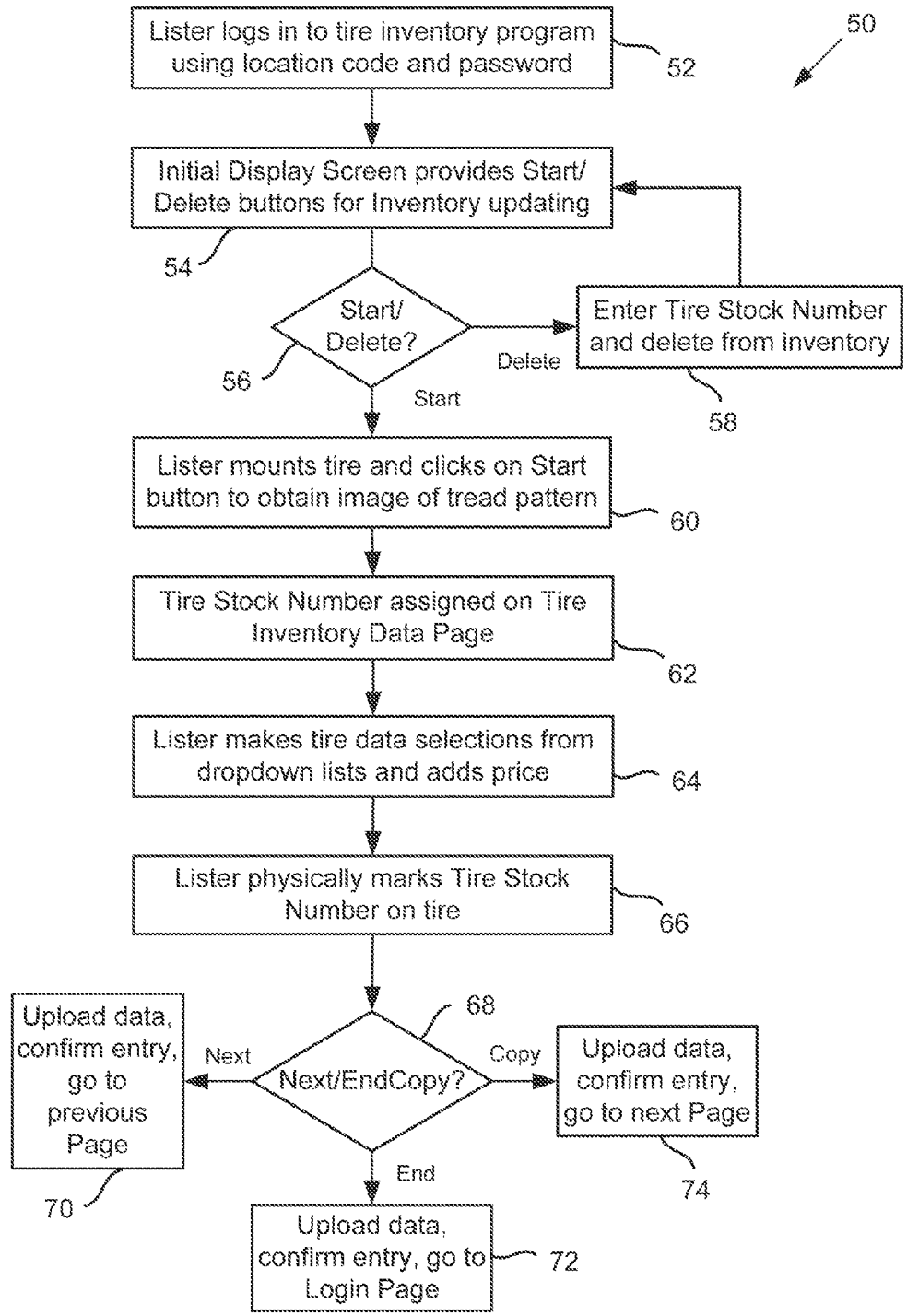
FIG. 3 is a flow diagram illustrating steps for entering tire data into a tire inventory and promotion database with a computing device or mobile communication device that can be used in conjunction with the tire inventory station of FIG. 1.

Operation of the tire inventory station 10 may be explained with reference to a flow diagram 50, in FIG. 3. The Tire Lister may enter a location code 44 and password 48 on a "log in" page 43, at step 52, to access a tire inventory software program 42 resident in the computing device 40 or in a mobile communication device (not shown). As seen in a tire inventory system 100 of FIG. 4, the entry of the location code 44 and the password 48 may bring the Tire Lister to an initial display screen 80 having a "Start button" 82, at step 54. The initial display screen 80 may include a "Start button" 82, a "Delete button" 84, and an inventory stock number field 86. If, at decision block 56, the Tire Lister wishes to modify the tire inventory by removing an identified tire from inventory, the stock number of the identified tire may be entered in the inventory stock number field 86, and the Delete button 84 is selected, at step 58. The process may return to the initial display screen 80, at step 54.

If, at decision block 56, the Tire Lister wishes to modify the tire inventory by adding a tire to a tire inventory database 77 in a tire inventory server 75, the Start button 82 may be selected. The tire 20 selected for listing in the database may be suspended from the tire support arms 18, as shown in FIGS. 1 and 2. When the Tire Lister "clicks on" the Start button 82, the imaging device 30 obtains a tire tread image 88, as captured by the imaging lens 32, at step 60. The tire inventory software program 42 enables the Tire Lister to transmit the obtained tread images to the tire inventory server 75, at step 60, via a LAN, or a WAN cellular modem, such as the Internet 76.

Figure 5:
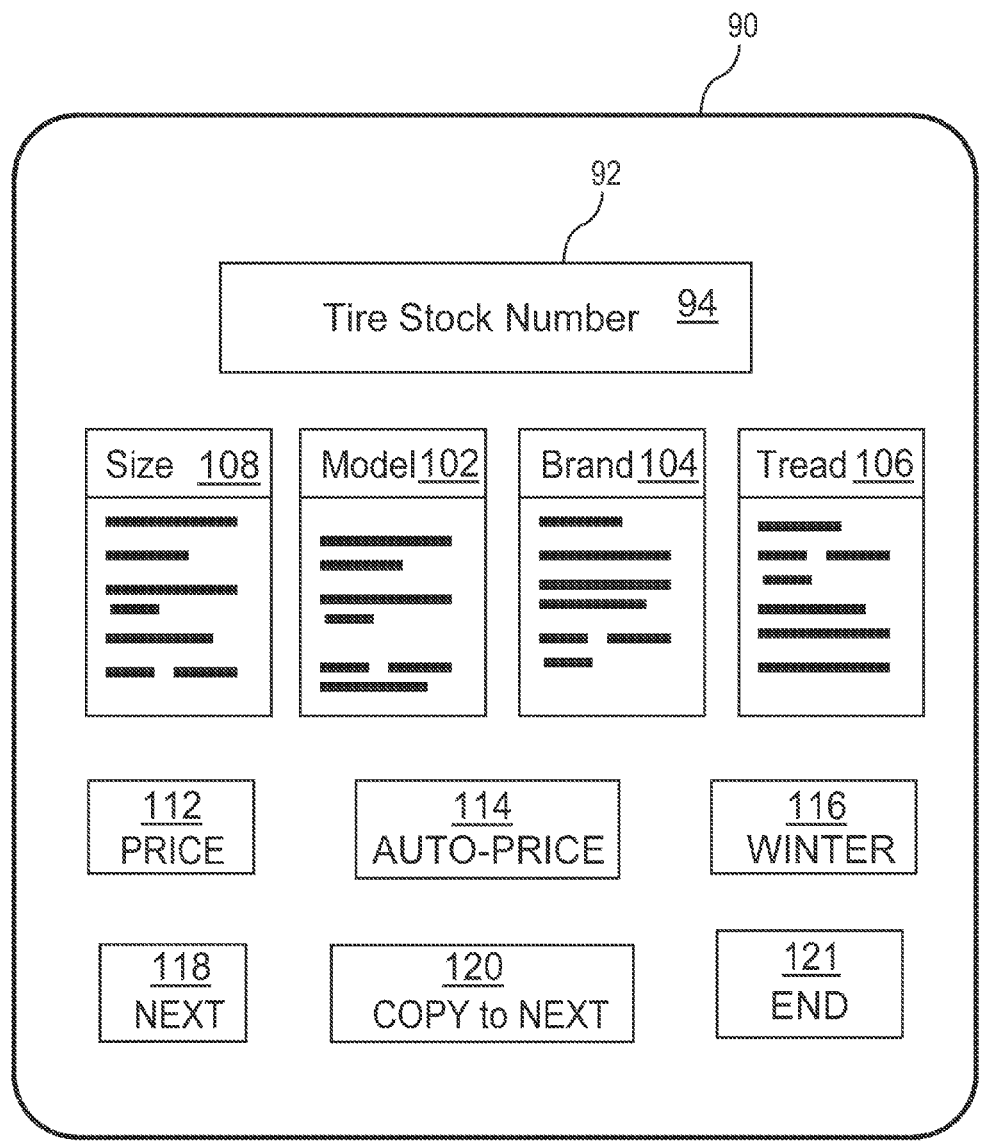
FIG. 5 is an example of a tire inventory data page displayed in the computing or mobile communication device of FIGS. 1 and 2.

After the tire tread image 88 has been acquired, the computing device 40 may display a tire inventory data page 90 shown in FIG. 5, at step 60. The tire inventory data page 90 may include a window 92 providing a server-generated or computer-assigned tire stock number 94 assigned to the tire 20, at step 62. The tire inventory data page 90 may further include one or more drop-down lists such as, for example, a dropdown list 108 for specifying the tire size, a dropdown list 102 for specifying the tire model, and a dropdown list 104 for specifying the tire brand, at step 64. The inventory data screen may also include a dropdown list 106 for selecting from a list of depth values the tire tread depth measurement reading obtained for the tire 20 with the tire tread depth gauge 34. In an alternative embodiment, a window (not shown) may be provided by tire inventory software program 42 for entering a numerical value from a keyboard or touchscreen for the measured tire tread depth, tire size, tire brand, tire model, and tire price.

The Tire Lister may also state a selling price 112 for the tire 20, or may choose a suggested value provided by the tire inventory server 75 and listed in an auto-price field 114. In an exemplary embodiment, clicking on the auto-price field 114 will initiate a search by the tire inventory server 75 of all the records in the tire inventory database 77 having the same tire size. The tire inventory server 75 may respond to the search request by deriving a suggested value for the tire 20 from the average price found in the tire inventory database 77 for tires similar to tire 20, and having a average tread depth similar to tire 20, in accordance with tire inventory software program 42. In addition, the Tire Lister may indicate whether or not the tire is a winter tread tire 116. The Tire Lister may physically mark the computer-assigned tire stock number 94 on the tire 20 using the grease pencil 36 or adhesive label, at step 66.

At this point, the Tire Lister has the option of selecting either a "Next button" 118, a "Copy to Next Record" button 120, or an "End" button 121, at decision block 68. Selecting the Next button 118 to add another tire record, at step 70, causes an upload to the tire inventory server 75 of the tire tread image 88 and of the data entered in the tire inventory data page 90 for the tire 20. The tire inventory server 75 may send confirmation to the Tire Lister of the addition of the tire 20 to inventory by, for example, transmitting a copy of the updated inventory organized by tire size, tire model, tire brand, tire tread depth, and tire price. The confirmation action may be executed by: (i) sending a facsimile confirmation to a fax machine 78 accessible by the Tire Lister, (ii) by sending an e-mail confirmation to the computing device 40 or mobile communication device accessible by the Tire Lister, or (iii) by sending both the fax confirmation and the e-mail confirmation to the Tire Lister.

Figure 8:
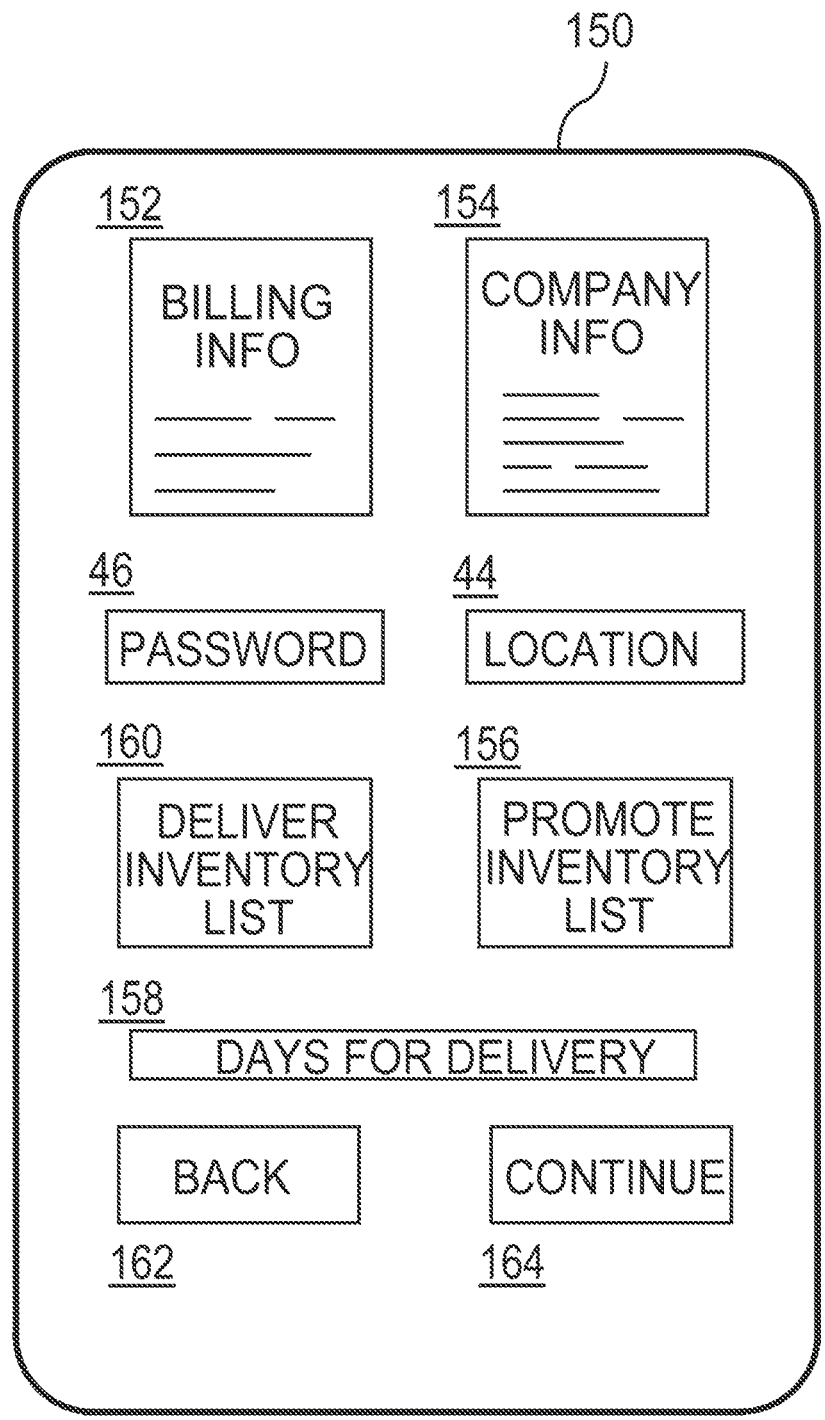
FIG. 8 is an example of a profile page accessed by the prospective user in the process of setting up the account for listing tire data in the in the tire inventory and promotion system of FIG. 4.

The confirmation transmittal may be executed on a date and time specified on a profile page 150 of the Tire Lister, shown in FIG. 8 below, as generated by the tire inventory server 75. The Tire Lister may thus have access to a specified tire inventory online, and may be able to search the specified tire inventory database 77 using one or more of data parameters including, for example: tire size, tire brand, tire model, and tire stock number.

The Tire Lister may alternatively click on the End button 121, at step 72, to (i) cause an upload to the tire inventory server 75 of the tire tread image 88, (ii) cause the data entered in the tire inventory data page 90 to upload to the tire inventory server 75, (iii) exit the tire inventory software program 42, and (iv) return to the Login page of step 52.

Figure 6:
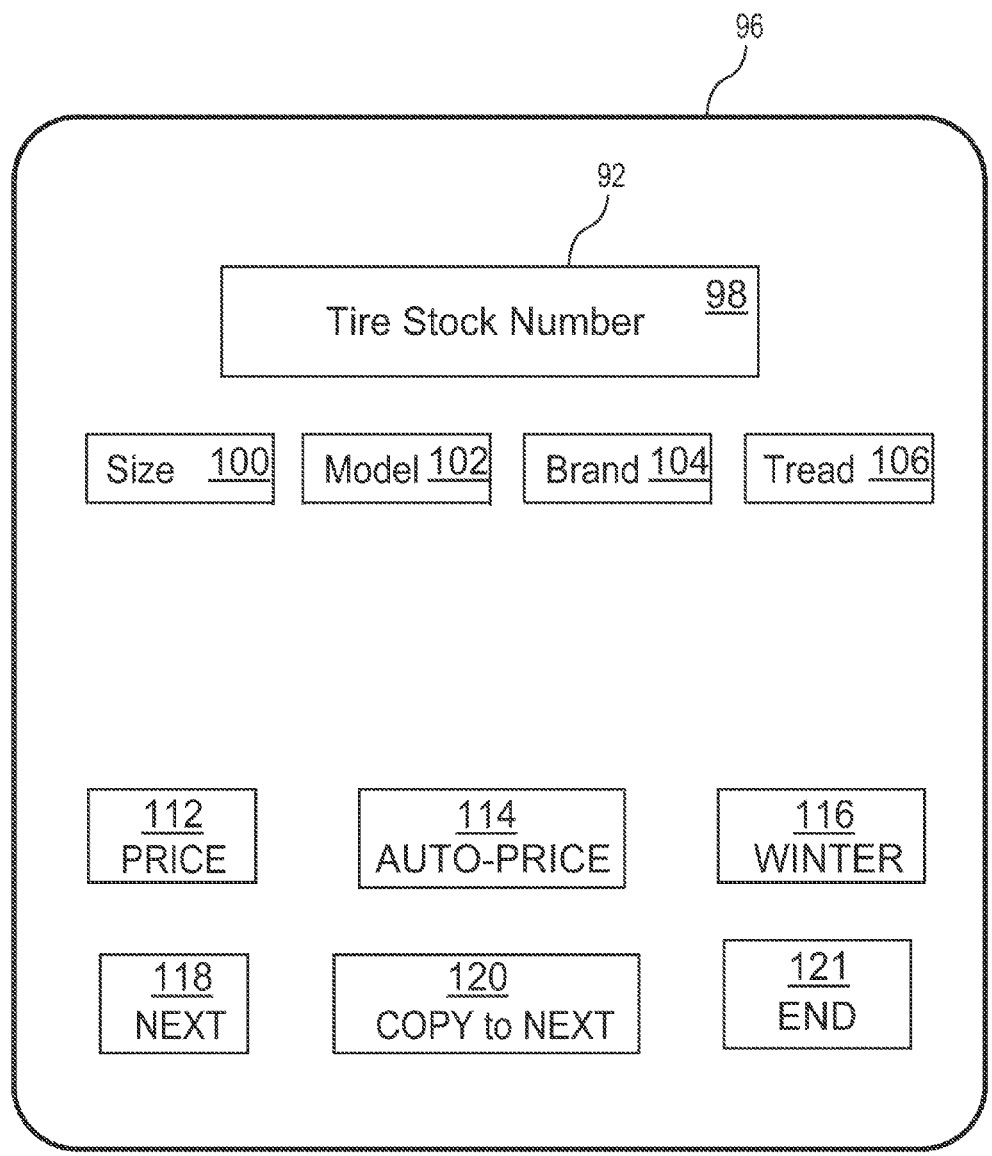
FIG. 6 is a second tire inventory data page accessed from the tire inventory data page of FIG. 5.

Selecting the Copy to Next Record button 120, at step 74, causes an upload to the tire inventory server 75 of the tire tread image 88 and of the data entered in the tire inventory data page 90, and serves to copy and transmit the data entered in the tire inventory data page 90 to a next inventory data page 96, shown in FIG. 6. As can be appreciated, a different tire stock number 98 is assigned to the next inventory data page 96, and is thus assigned to the next tire 20 the Tire Lister places on the tire support arms 18. This data copying action serves to save the Tire Lister the effort to re-enter the same data if the tire to be catalogued in the next inventory data page 96 is essentially the same as the tire 20 data catalogued in the inventory data page 90.

The procedure for assigning the computer-assigned stock numbers 94 may be explained by the following example: If a Tire Lister has one hundred tires in stock, and enters the tires into the tire inventory software program 42, the tires may be assigned respective tire stock numbers 0001 through 0100, for example. If tire stock number 0045 and tire stock number 0060 are sold, for example, and removed from the inventory, the next time new inventory is added, the tire inventory server 75 may assign tire stock numbers 0045 and 0060 for the next tire entries. This procedure may be followed as it allows the Tire Lister to numerically organize the tire inventory such that, when a particular tire is sought, the Tire Lister will have a tire stock number with which to conduct a search.

Figure 4:
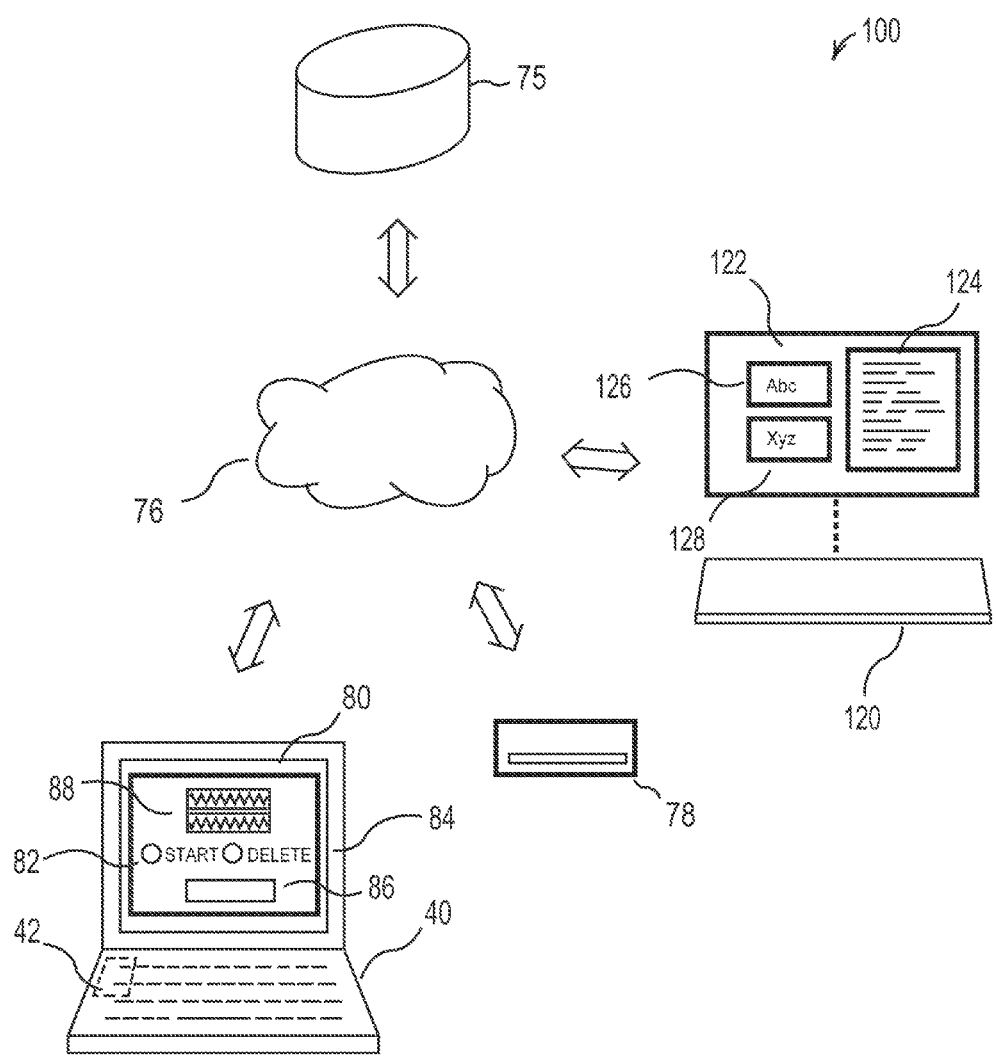
FIG. 4 is a diagrammatical illustration of a tire inventory and promotion system accessed by the user of the tire inventory station of FIG. 1.

In an exemplary embodiment, a potential tire customer may be able to independently search the multiple tire inventory databases 77 simultaneously in the tire inventory server 75 by accessing a tire inventory website 122 on a customer communication device 120, such as a laptop, a smart phone, or a tablet as shown in FIG. 4. As can be appreciated by one skilled in the art, the tire inventory website 122 can be promoted through various methods of advertising, and by use of social media.

The tire customer may search for specific tires by entering values for one or more of the following tire parameters: tire size, tire brand, tire model, tire tread depth, and tire location proximity. The tire inventory website 122 may display a tire list 124 generated by the tire inventory server 75 in response to the one or more values for search parameters 126, 128 entered by the customer.

When the customer selects an entry in the tire list 124 by highlighting and clicking, for example, the tire inventory website 122 display may provide a more detailed record of the selected entry such as, for example, an image of the actual tire tread, and the contact information of the tire seller. Accordingly, the tire customer may contact the tire seller directly and complete the sale in person or by telephone.

Figure 7:
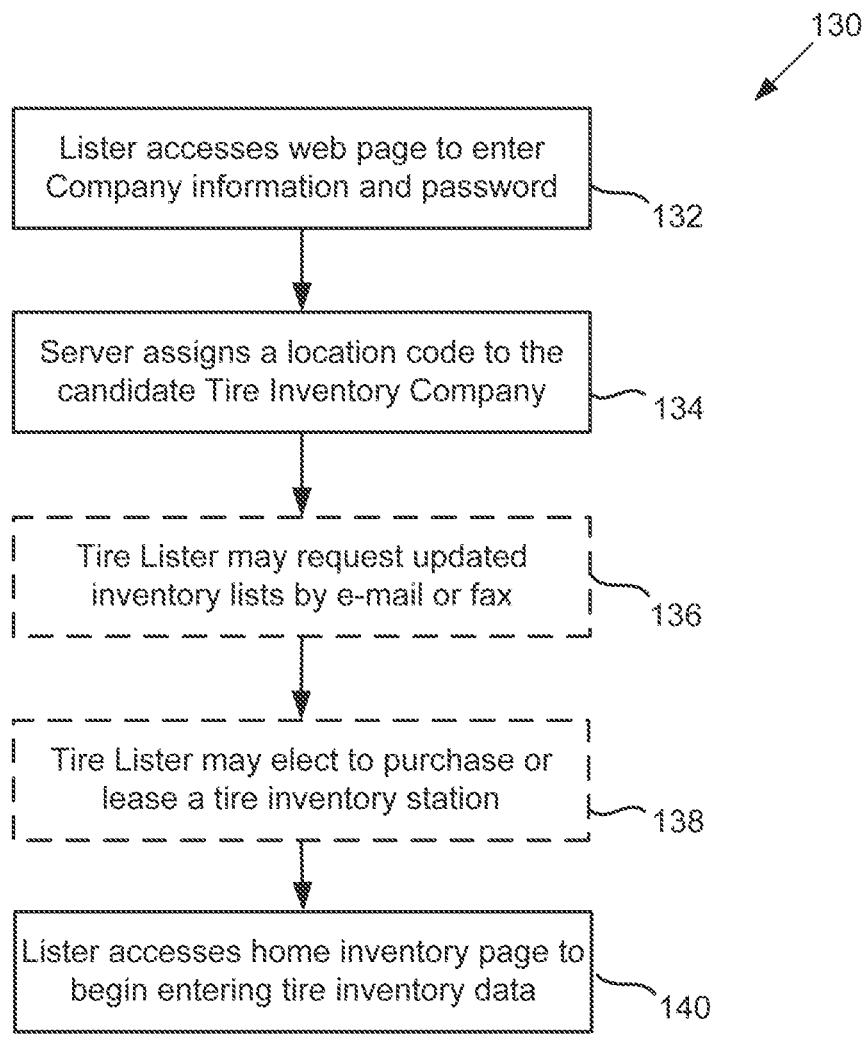
FIG. 7 is flow diagram illustrating a prospective user setting up an account for listing tire data in the tire inventory and promotion system of FIG. 4.

A prospective Tire Lister may sign up a candidate tire inventory company for the above-described tire inventory service by following a procedure described with reference to a flow diagram 130, in FIG. 7. The Tire Lister may access the on-line profile page 150, enter billing information 152, enter company information 154, and select the password 46, at step 132.

At step 134, the Tire Lister may also choose whether to receive updated inventory lists, by e-mail or by facsimile for example. The Tire Lister may specify the days for delivery of the updated inventory lists in a "Days for Delivery" window 158. The Tire Lister may also elect to have the tire inventory of the candidate tire inventory company promoted, by accessing an inventory promotion window 160. A "Back button" 162 and a "Continue button" 164 may be provided to allow the Tire Lister to navigate between web pages.

At step 136, the location code 44 is assigned by the tire inventory server 75 for the address, or physical location, of the candidate tire inventory company. The Tire Lister may further elect to purchase or lease the tire inventory station 10, at step 138. If the tire inventory station 10 is to be purchased, the Tire Lister may be taken to either the log in page 43 or the initial display screen 80 to complete the purchase or lease process. Otherwise, the Tire Lister may be taken to the tire inventory data page 90 where the Tire Lister can begin entering tire inventory data via the inventory station 10, at step 140, as described above, or by using a mobile communication device or computing tablet, as described below.

If the Tire Lister has elected to forego purchase or lease of the tire inventory station 10, the Tire Lister can log in to the tire inventory website 122 by entering the location code 44 and the password 46 on a computer tablet, such as an IPAD, or via a mobile communication device, such as a SMART-PHONE. Once logged in the Tire Lister may be taken to a screen showing the initial display screen 80 on the display of the mobile device, including the start button 82, the user field 86, and the delete button 84 as described above. Preferably, the computer tablet or mobile communication device used by the Tire Lister includes a previously-loaded application that functions to enhance access to the tire inventory website 122.

When the Start button 82 is clicked on, the tire tread image 88 is: (i) automatically acquired with a camera in the mobile device or tablet; (ii) uploaded to the tire inventory server 75; and, (iii) displays a next page that may include the computer-assigned tire stock number 94, and the plurality of dropdown lists 108, 102, 104, and 106, as described above.

The Tire Lister may also enter a price for the tire 20, or the auto-price option 114 may be selected, as described above. The location of the tire 20, that is, the physical address of the tire inventory company, may also be provided, along with a notation as to whether the tire 20 is a winter tire 116. The Tire Lister can then physically mark the tire 20 with the computer assigned stock number 94 in grease pencil or with a self-adhering label. The Tire Lister may then select the Next button 118 to add another record, or may select the End button 121 to exit the tire inventory software program 42.

It is to be understood that the description herein is exemplary of the invention only and is intended to provide an overview for the understanding of the nature and character of the disclosed illumination systems. The accompanying drawings are included to provide a further understanding of various features and embodiments of the method and devices of the invention which, together with their description serve to explain the principles and operation of the invention.

What is claimed is:

1. A method of modifying a tire inventory database resident in a tire inventory server, said method comprising the steps of:
   using an imaging device to obtain an image of a tread pattern of a selected tire;
   using a tire tread depth gauge to measure tread depth on said selected tire to obtain a tread depth reading; and
   transmitting said image of said tread pattern of said selected tire and said tread depth reading to the tire inventory server.

2. The method of modifying a tire inventory database of claim 1 wherein said imaging device comprises one of a digital camera, a video recorder, or a mobile communication device with an internal camera.

3. The method of modifying a tire inventory database of claim 1 further comprising the step of suspending said selected tire on tire support arms.

4. The method of modifying a tire inventory database of claim 1 further comprising the step of transmitting at least one of: tire size information, tire model information, tire tread depth, tire location, and tire brand information to the tire inventory server.

5. The method of modifying a tire inventory database of claim 1 further comprising the step of transmitting to the tire inventory server a price for said selected tire.

6. The method of modifying a tire inventory database of claim 5 wherein said price comprises a suggested value provided by said tire inventory server.

7. The method of modifying a tire inventory database of claim 5 wherein said suggested value comprises a value derived from an average price for inventory database tires similar to said selected tire, said inventory database tires having an average tread depth similar to said selected tire.

8. The method of modifying a tire inventory database of claim 4 further comprising the steps of:
   searching records in the tire inventory database for tires having the same tire size as said selected tire; and
   deriving said suggested value according to an average price found in the tire inventory database for said tires having the same tire size as said selected tire and having an average tread depth similar to said selected tire.

9. The method of modifying a tire inventory database of claim 1 further comprising the step of generating and assigning a tire stock number to said selected tire.

10. The method of modifying a tire inventory database of claim 1 further comprising the step of promoting said tire inventory database through the use of social media.

11. The method of modifying a tire inventory database of claim 1 further comprising the step of confirming the transmittal of said image of tread pattern and said tread depth reading, said step of confirming including the step of receiving from the tire inventory server an updated tire inventory.

12. The method of modifying a tire inventory database of claim 1 wherein said step of receiving comprises receiving said updated inventory by at least one of e-mail or facsimile.

13. A tire inventory station, suitable for use in modifying a tire inventory database, said tire inventory station comprising:
   a first support beam fixed to a base;
   a work platform secured to a second support beam, said second support beam slideably retained in said first support beam;
   a first tire support arm having an end attached to one of said first and second support beams so as to form a first cantilever member;
   a second tire support arm having an end attached to one of said first and second support beams so as to form a second cantilever member, said first tire support arm and said second tire support arm functioning to suspend the tire at different desired working heights;
   an imaging device removeably attached to an underside of said work platform, said imaging device positioned so as to obtain an image of a tread pattern of a supported tire; and,
   a tire depth gauge provided on said work platform.

14. The tire inventory station of claim 13 further comprising at least one of a laptop, computer tablet, or mobile communication device, said at least one of a laptop, computer tablet, or mobile communication device in communication with said imaging device, said at least one of a laptop, computer tablet, or mobile communication device further configured for communication with a communication network.

15. The tire inventory station of claim 14 wherein said at least one of a laptop, computer tablet, or mobile communication device comprises a tire inventory software program, said tire inventory software program functioning to enable a user to access a tire inventory database resident in a tire inventory server.

16. The tire inventory station of claim 14 wherein said at least one of a laptop, computer tablet, or mobile communication device functions to transmit to the tire inventory database a tread image acquired by said imaging device.

17. The tire inventory station of claim 14 wherein said at least one of a laptop, computer tablet, or mobile communication device functions to transmit to the tire inventory database a tread depth value obtained by a user of said tire inventory station.

18. A tire inventory system, suitable for access by a prospective tire customer, said tire inventory system comprising:
   a tire inventory server including a tire inventory database, said tire inventory database including tire tread depth data for each of a plurality of tires;
   a work platform having support arms for suspending a tire at different desired working heights, said work platform having an imaging device removeably attached to an underside of said work platform, said imaging device positioned so as to obtain an image of a tread pattern of said supported tire;
   at least one of a laptop, computer tablet, or mobile communication device accessible by a user of said work platform, said at least one of a laptop, computer tablet, or mobile communication device including a tire inventory software program, said at least one of a laptop, computer tablet, or mobile communication device further in communication with said tire inventory server via said tire inventory software program for enabling said user to enter tire tread depth data into said tire inventory database; and,
   a customer communication device in communication with said tire inventory server for enabling the prospective tire customer to search the tire inventory database.

19. The tire inventory system of claim 18 wherein said tire inventory database is configured to allow said prospective tire customer to search for a tire by one or more of: tire size, tire brand, tire model, tire tread depth, if a winter tire, and tire location.

20. The tire inventory system of claim 18 wherein said tire inventory database is configured to allow said prospective tire customer to view an image of tire tread for a selected tire in the tire inventory database.

* * * * *